United States Patent Office 3,232,026
Patented Feb. 1, 1966

3,232,026
SEPARATION METHOD USING ACTIVATED
DIFFUSION BARRIERS
David L. McKinley, 1413 Sattes Circle, Nitro, W. Va.
No Drawing. Filed Apr. 2, 1962, Ser. No. 184,584
6 Claims. (Cl. 55—16)

The present invention relates to a method for separating a selected component gas from a multicomponent gas mixture using gas permeation techniques and more particularly to novel gas permeator barriers which are permeable to specific gases and impermeable to other gases. The invention comprehends using permeator barriers coated with substances which increase the rates at which diffusates are transformed into a diffusible or transportable state and which resist poisoning by contaminant substances in the multicomponent gas mixtures. As a result of this throughput rate increase, gas permeator apparatus can be operated at considerably lower temperatures than heretofore possible.

It is known that a selected component gas comprised in a multicomponent gas mixture can be separated out of said mixture by directing a stream of the mixture against a barrier which is permeable to the selected component gas but impermeable to other components of the mixture, and collecting the selected component gas on the side of the barrier opposite the side against which the stream is directed. It is known, for example, that silver is permeable to oxygen and palladium to hydrogen. Thus, by directing streams of multicomponent gases containing, respectively, oxygen and hydrogen against respective barriers of silver and palladium, the oxygen and hydrogen components of the streams can be selectively separated and collected in high purity states. In the ensuing disclosure hydrogen separation will be discussed.

High purity hydrogen in large quantities is required in many industrial chemical production processes and procurement of hydrogen supplies of adequate purity at reasonable cost has long been a matter of concern to industry. Commercial production of high purity hydrogen by the use of hydrogen-specific barriers, such as palladium, has long been the desire of the gas processing industries. Such processes, however, have been severely hampered by the high cost of the palladium barriers in relation to their useful life and productivity. While hydrogen of very high purity can be obtained by the known method of selective diffusion of multicomponent gases containing hydrogen through palladium foil-coated barriers, present apparatus limitations attendant thereon, due to the high cost of palladium metal and the inherently low productivity or throughput rates of available barrier equipment, militate against commercial practicality of this method. Palladium diffusers have thus heretofore been limited generally to laboratory or other special uses where relatively small quantities of hydrogen are produced. Use of the method of selective diffusion of hydrogen through hydrogen-permeable palladium foil-coated barriers on a commercial scale would be highly desirable if some of the more salient difficulties attending the use of palladium foils or coatings on the barriers could be overcome.

A particular problem concerns the production of effectively thin and sufficiently strong palladium foils. Until very recently, it has not been possible, according to common metal working techniques, to form suitably sized palladium sheets or foils less than one mil thick. Since the rate of diffusion of hydrogen through palladium is inversely proportional to the thickness of the palladium foil or sheet, ultra-thin foils of thickness of the order of one-tenth mil, for example, provide for higher throughput or diffusion rates and permit employment of relatively low flow-sustaining pressure differentials across the barriers. Recent improvements have been made in metal working techniques which permit the production of palladium foils of thickness of the order of one-half mil but these are limited to relatively small uniform thickness areas. As to the desideratum of a one-tenth mil thick foil, the art has been unable to provide even as much as a one square foot area of such foil which, during use in a diffuser can be maintained free from the occurrence of minute orifices or dendritic holes and cracks for a reasonable period of time. Thus, it has been necessary to effect a compromise between the expense of a workable thickness of palladium to attain a reasonable useful life and the related costs of heating and of stream compression to maintain the required pressure differential across the barrier.

Another limitation encountered in the use of the hydrogen permeators of current design is the requirement that they be operated at temperatures between 300° C. and 400° C. Because of these relatively high operating temperatures, a large heating system and the use of expensive construction materials are required. A hydrogen-permeable diffuser apparatus operable at say 200° C., even at the sacrifice of some degree of permeability or throughput rate would provide a significant improvement over one which must be operated at high temperatures. At 200° C., a permeator housing and all internal parts could be fabricated from carbon steel rather than chrome or austenitic stainless steels. Heating of the feed gas to the permeator could be accomplished with intermediate pressure steam rather than expensive heating systems. Operation in the range of 200° C. rather than 300° C.–400° C. also permits different construction methods for the permeator apparatus effecting lower construction costs. At 200° C., certain plastic and rubber materials as well as inexpensive cements can be used for gasketing, sealing and the like. Prior to the time of the present invention, the benefits of low temperature diffuser operation could not be fully realized because while the permeability of a given barrier is reproducible at temperatures in the order of 350° C., at 200° C., the permeability varies, ranging from less than 25 percent to about 60 percent of the value that is obtained at 350° C.

Another problem encountered in the use of known permeator apparatus operating at depressed temperatures is that when multicomponent gas mixtures are impinged on a barrier for any appreciable period of time, the barrier's active surface becomes poisoned and the permeability of the barrier foil falls rapidly. This is thought to be due to the clogging action of the contaminants adsorbed on the foil surface preventing catalytic contact of the selected component gas to be diffused with the dissociating surface of the foil.

From the foregoing discussion it can be readily appreciated that an improvement in the permeator art which increases the throughput rate or permeability of a barrier of given thickness and which, in addition mitigates barrier poisoning and permits operation at the desirable lower temperature range of about 200° C. affords a significant contribution to the gas separation art.

With a diffusion barrier fabricated according to the method of the present invention, the permeability of a palladium or palladium-siver alloy film or foil can be stabilized at a temperature of about 200° C. in its highest permeability condition to obtain consistently reproducible throughput rates of hydrogen. Palladium-silver alloy foils and films are known to increase permeability to a certain extent even in known diffusion processes.

In general, the present invention comprehends coating the hydrogen permeable film or foil of the diffuser barrier with a very thin layer of collodial palladium black or other finely divided hydrogen dissociation catalyst in order to increase the activity of the film or foil surface against which a hydrogen-containing multicomponent gas stream is directed. It has been found that when a foil has been coated with palladium black for example, in accordance with my invention, its permeability at a temperature of 200° C. remains constant at a value which is approximately four times greater than that of the same foil uncoated, even when contaminant-containing streams have been used as feedstocks.

In the ensuing discussion, the present invention will be described with greater particularity.

An overall gas permeation process involves the following occurrences: (1) the molecular gas which has been preselected for diffusion, for example hydrogen, is adsorbed and dissociates at the metal surface of the foil through which it is permeable, for example a palladium foil, and goes into solution in the metal atomically; (2) the dissociated gas diffuses through the lattice structure of the metal; (3) upon reaching the surface opposite the initially contacted surface of the metal, the atomic gas recombines into molecular gas and leaves the surface, proceeding downstream to a suitable collection point. Gases other than the selected gas are drawn off on the upstream side of the barrier through which they cannot permeate. The rate at which the initial dissociation and eventual recombination takes place is proportional to the number of catalytically active sites per unit area of the foil surfaces upon which the feedstock stream of multicomponent gas impinges and at which the recombination step takes place. When a finely divided deposit of a substance which can catalytically effect the dissociation of the selected gas is added to the foil surfaces the number of active sites per unit of foil area increases, and brings about higher dissociation and recombination rates and consequently increases throughput rate. The diffusion rate must, of course, also increase, but, for a given foil thickness, overall high permeability depends primarily upon the dissociation-recombination rate that can be achieved, particularly at the aforementioned desireable lower operating temperatures.

The application of the finely divided activating substances can be effected in a number of ways. Such deposits may be obtained by electroplating, thermal decomposition, reduction of a metallic compound, or by vapor plating, the latter being a technique discussed in the copending application of R. W. Pierce, entitled, "Metal Films for Purifying Gases," application Serial No. 184,159, filed April 2, 1962.

In particular operation according to the method of the present invention, the addition of collodial palladium black to palladium and palladium-silver alloy films was found to enhance and stabilize hydrogen diffusion rates at lower temperatures where, heretofore, hydrogen dissociation-recombination rates and contaminate adsorption on the foil surface (poisoning) were controlling factors in operation.

The following test results will illustrate the efficacy of the present invention and show the advantage of foils according to the invention over conventional foils.

EXAMPLES 1 AND 2

In order to provide a basis for comparison, tests were performed on both pure palladium and on palladium-silver alloy foils. One mil thick foils of pure palladium and one and two mil thick foils of palladium-silver alloy were tested. The alloy contains 73 percent palladium and 27 percent silver. The actual foil thicknesses, which are tabulated, were determined both by weight-area measurement and by direct measurement using a mounted dial gauge micrometer device accurate to ±0.01 mils. The foils were supported on porous stainless steel substrates $\frac{1}{16}$ inch thick. The tests were made in laboratory scale diffusion cells, the elements of which are within the ken of persons familiar with the art. Each run was of a week's duration or longer, and leak tests were made with nitrogen at the start and completion of each run, to confirm the integrity of the barriers. Diffusion cell operating temperature was maintained at 350° C. for the pure palladium foil tests and at both 350° C. and 200° C. for the palladium-silver alloy foil tests. A pressure differential of 75 p.s.i. was maintained across the barriers. Feed gas was cylinder hydrogen having a purity of about 99%.

In the table s.c.f.h. means standard cubic feet per hour, referred to atmospheric pressure.

Table I shows the results of tests made on pure palladium foils.

*Table I*

| Run No. | Foil thickness | | Barrier area, sq ft. | Hydrogen diffusion rate measured, s.c.f.h. |
|---|---|---|---|---|
| | Nominal, mils | Actual, mils | | |
| 1 | 0.3 | 0.29 | 0.90294 | 0.405 |
| 2 | 0.3 | 0.29 | 0.00294 | 0.410 |
| 3 | 0.5 | 0.45 | 0.00294 | 0.300 |
| 4 | 0.5 | 0.45 | 0.00294 | 0.300 |
| 5 | 1.0 | 1.11 | 0.00294 | 0.145 |
| 6 | 1.0 | 1.11 | 0.00294 | 0.140 |

Table II shows the results of tests made on palladium-silver alloy foils.

*Table II*

| Run No. | Foil thickness, mils | | Operating temperature, ° C. | Barrier area, sq. ft. | Hydrogen diffusion rate measured, s.c.f.h. |
|---|---|---|---|---|---|
| | [1] a | [2] b | | | |
| 1 | 0.96 | 1.00 | 350 | 0.0028 | 0.250 |
| | | | 200 | | 0.065–0.080 |
| 2 | 0.95 | 0.97 | 350 | 0.0028 | 0.300–0.305 |
| | | | 200 | | 0.170–0.175 |
| 3 | 0.97 | 1.00 | 350 | 0.0028 | 0.270 |
| | | | 200 | | 0.115 |
| 4 | 0.93 | 0.95 | 350 | 0.0028 | 0.280 |
| | | | 200 | | 0.100 |
| 5 | 1.88 | 1.87 | 350 | 0.0028 | 0.145 |
| | | | 200 | | 0.060–0.065 |
| 6 | 1.95 | 2.02 | 350 | 0.0028 | 0.130–0.135 |
| | | | 200 | | 0.060 |
| 7 | 1.89 | 1.88 | 350 | 0.0028 | 0.145–0.155 |
| | | | 200 | | 0.085 |

[1] By direct measurement.   [2] By weight measurement.

The tabulated results in Tables I and II show that the hydrogen diffusion rate at 350° C. is reasonably reproducible and is inversely proportional to the foil thickness. On the other hand, at 200° C., permeability, particularly in the one mil thick foil, varies widely, and is not at all consistently reproducible. This variation at the lower temperature indicates that the hydrogen dissociation-recombination rate at the foil surfaces is the main determinant affecting the overall throughput rate or permeability.

EXAMPLE 3

In order to illustrate the effect on uncoated barrier performance at 200° C. operation when a feedstock other than substantially pure hydrogen is directed against a palladium-silver alloy barrier, a 1 mil thick foil (0.94 mil by direct measurement and 0.98 mil by weight measurement) having a surface area of 0.0029 sq. ft. and mounted on a 1/16 inch stainless steel substrate, was tested first with cylinder hydrogen, then with hydrogen-methane fuel gas having a high contaminant concentration and then with cylinder hydrogen again. The results of this test are tabulated in Table III.

*Table III*

| Time from the start of the run (days) | Feed gas | Percent $H_2$ on the upstream side of the barrier (Avg.), percent | Hydrogen diffusion rate, s.c.f.h. |
|---|---|---|---|
| 0 | Cyl. $H_2$ | 100 | |
| 1 | Cyl. $H_2$ | 100 | 0.145 |
| 2 | Cyl. $H_2$ | 100 | 0.145 |
| 3 | Cyl. $H_2$ | 100 | 0.140 |
| 4 | Cyl. $H_2$ | 100 | 0.130 |
| 5 | Cyl. $H_2$ | 100 | 0.125 |
| 6 | Cyl. $H_2$ | 100 | 0.120 |
| 6 | Switched to $H_2$-$CH_4$ fuel gas | | |
| 7 | $H_2$-$CH_4$ fuel gas | 56.2 | 0.027 |
| 8 | do | 56.2 | 0.029 |
| 9 | do | 53.5 | 0.029 |
| 10 | do | 56.9 | 0.031 |
| 11 | do | 55.8 | 0.027 |
| 12 | do | 52.6 | 0.019 |
| 13 | do | 55.9 | 0.020 |
| 14 | do | 54.8 | 0.019 |
| 15 | do | 55.1 | 0.020 |
| 16 | do | | 0.014 |
| 17 | do | 56.8 | 0.017 |
| 18 | do | | 0.018 |
| 19 | do | 55.1 | 0.016 |
| 20 | do | | 0.016 |
| 21 | do | 52.2 | 0.018 |
| 22 | do | | 0.018 |
| 23 | do | 53.0 | 0.017 |
| 24 | do | | 0.017 |
| 25 | do | 54.1 | 0.015 |
| 26 | do | | 0.014 |
| 27 | do | 49.9 | 0.015 |
| 28 | do | | 0.015 |
| 28 | Switched back to cylinder hydrogen | | |
| 29 | Cyl. $H_2$ | 100 | 0.066 |
| 30 | Cyl. $H_2$ | 100 | 0.066 |
| 31 | Cyl. $H_2$ | 100 | 0.067 |
| 32 | Cyl. $H_2$ | 100 | 0.068 |
| 33 | Cyl. $H_2$ | 100 | 0.067 |

EXAMPLE 4

To illustrate the efficacy of a coated foil according to the present invention, in operation at 200° C. when a feedstock other than substantially pure hydrogen is used, a one mil nominal thickness foil of palladium-silver alloy was electroplated on both sides with palladium at a high current density in a standard acid chloride plating bath. Palladium was deposited on both foil surfaces as an adherent palladium black. The foil had a surface area of 0.0028 sq. ft. and was mounted on a 1/16 inch thick stainless steel substrate. The palladium black could have been applied in other ways as noted above. When electroplating is used, the current density need be increased only slightly beyond value to produce normal palladium plating in order to effect a black coating. The foil thickness after the coating as determined by direct measurement was 2.4 mils and as determined by weight measurement 1.13 mils. Because of the roughened surface of the coated foil, the direct measurement is deemed somewhat inaccurate and it is preferred to use weight measurements in determining permeability coefficients for specific foils.

The results of tests on a coated foil barrier are tabulated in Table IV.

*Table IV*

| Time from the start of the run (days) | Feed gas | Percent $H_2$ on the upstream side of the barrier (average), percent | Hydrogen diffusion rate, s.c.f.h. |
|---|---|---|---|
| 0 | Cyl. $H_2$ | 100 | |
| 1 | Cyl. $H_2$ | 100 | 0.120 |
| 2 | Cyl. $H_2$ | 100 | 0.115 |
| 3 | Cyl. $H_2$ | 100 | 0.110 |
| 4 | Cyl. $H_2$ | 100 | 0.110 |
| 4 | Switched to $H_2$-$CH_4$ fuel gas | | |
| 5 | $H_2$-$CH_4$ fuel gas | 53.0 | 0.058 |
| 6 | do | 56.2 | 0.062 |
| 7 | do | 60.0 | 0.064 |
| 8 | do | 55.4 | 0.064 |
| 9 | do | 56.1 | 0.063 |
| 10 | do | 56.1 | 0.061 |
| 11 | do | 56.0 | 0.059 |
| 12 | do | 53.4 | 0.058 |
| 13 | do | 52.5 | 0.058 |
| 14 | do | | 0.054 |
| 15 | do | 53.5 | 0.061 |
| 16 | do | | 0.059 |
| 17 | do | 53.1 | 0.058 |
| 18 | do | | 0.061 |
| 19 | do | 52.4 | 0.060 |
| 20 | do | | 0.062 |
| 21 | do | 52.6 | 0.058 |
| 22 | do | | 0.063 |
| 23 | do | 53.6 | 0.061 |
| 24 | do | | 0.059 |
| 25 | do | 59.1 | 0.065 |
| 26 | do | | 0.056 |
| 26 | Switched back to Cylinder Hydrogen | | |
| 27 | Cylinder hydrogen | 100 | 0.115 |
| 28 | do | 100 | 0.115 |
| 29 | do | 100 | 0.120 |
| 30 | do | 100 | 0.120 |

In Examples 3 and 4 the same apparatus arrangement was used as that in Examples I and II. Pressure differential across the barriers was maintained at 75 p.s.i. Cylinder hydrogen of a purity of 99+% was used as the hydrogen feedstock and the hydrogen-methane fuel gas used in the tests was obtained from a commercial gas separation unit.

The tabulated data of Examples 3 and 4 show that when an uncoated foil is used in separating hydrogen from a contaminant-containing mixture, the diffusion rate decreases rapidly but that when a coated foil is used, the diffusion rate is not at all adversely affected. In Table III, for example, the hydrogen diffusion rate dropped to an average of about 0.016 s.c.f.h. shortly after switching to a hydrogen-methane feed stream. The attenuation of permeability was still noticeable even after switching back to cylinder hydrogen. Table IV shows, however, that with a coated barrier, the hydrogen diffusion rate remained constant at about 0.060 s.c.f.h. after switching to the hydrogen-methane stream. When the cylinder hydrogen was again connected the diffusion rates measured were substantially equal to those noted in the days prior to switching over to the hydrogen-methane feed. The coated foil is thus seen to provide diffusion rates in the order of four times those obtainable with uncoated foils with all other operating parameters being equal.

Although only palladium black coating is specifically discussed hereinabove in the examples, improved diffusion of hydrogen when mixed with other gases can also be obtained at operating temperatures in the order of 200° C. by the application of other finely divided hydrogen dissociation catalyst to hydrogen permeable membranes. Such other materials include platinum, nickel, iron, cobalt, indium, sodium, lithium, uranium, titanium, zirconium, thorium, cerium, and ruthenium.

Also, although only palladium and palladium-silver alloy foils are treated in the examples, other palladium alloys, other metal alloys or even nonmetallic diffuser barriers which have relatively high hydrogen diffusion rates but low surface dissociation-recombination activity rates can be coated with palladium black or one of the other good hydrogen dissociation catalysts to increase surface activity and consequently the overall permeation or through-put rate. In such cases, the added advantage of rendering the barrier poison-resistant also accrues.

Further in accordance with the present invention, the surface activity and poison resistance characteristics of barriers which are selectively permeable to gases other than hydrogen can also be improved by coating such barriers with materials which increase the rate at which the selected diffusate is transformed into its diffusible or transportable state. For example, with gas-permeable plastic membranes used in certain applications where a selected gas diffuses through the plastic in solution or in a dissolved state, the plastic membrance surfaces can be coated with a finely divided substance which will increase the rate of solution of the diffusate gas into the plastic film. In the case of the separation of oxygen through silver membranes or foils, the surface activity of the silver will be enhanced by a coating of a catalyst such as collodial silver to increase the rate of reaction or solution of oxygen with silver.

While, in the foregoing description, certain specific details and operative steps have been set forth, together with certain suggested modifications, additional variation may be made in these without departing from the spirit of the present invention. The foregoing description has been given for clearness of understanding only, and no unnecessary limitations should be understood therefrom.

What is claimed is:

1. A method for separating a selected component gas from a multicomponent gas mixture which comprises the steps of directing a stream of the multicomponent gas mixture to a gas diffusion barrier having a foil layer which is permeable to the selected component gas and impermeable to other gases of the multicomponent gas mixture, said foil layer of said barrier being coated with a finely divided solid substance which is active in converting said selected component gas into a transportable state for diffusion through said barrier; converting said selected component gas into a transportable state at a proximal side of said foil layer for diffusion through said barrier; diffusing the converted selected component gas through said foil layer to a distal side thereof; reconverting said selected component gas from said transportable state to its original state at said distal side of said foil layer; and collecting said selected component gas after the reconversion, the rate of diffusion of said selected component gas being higher than that obtainable without said finely divided substance being coated on said foil layer.

2. A method for separating a selected component gas from a multicomponent gas mixture which comprises the steps of directing a stream of multicomponent gas mixture to a gas diffusion barrier having a foil layer which is permeable to the selected component gas and impermeable to other gases of the multicomponent gas mixture; converting said selected component gas into a transportable state at a proximal side of said foil layer for diffusion through said barrier; diffusing the converted selected component gas through said foil layer to a distal side thereof; reconverting said selected component gas from said transportable state to its original state at said distal side of said barrier; and collecting said selected component gas after the reconversion; said proximal side and said distal side of said foil layer being coated with a finely divided solid substance which is active both in converting said selected component gas into a transportable state for diffusion through said barrier and in reconverting said selected component gas from said transportable state to its original state, whereby the rate of diffusion of said selected component gas is higher than that obtainable without said finely divided substance being coated on said foil layer.

3. In a method for separating a selected component gas from a multicomponent gas mixture which method includes the steps of directing a stream of the multicomponent gas mixture to a gas diffusion barrier having a foil layer which is permeable to the selected component gas and impermeable to other gases of the multicomponent gas mixture, converting said selected component gas into a transportable state at a proximal side of said foil layer for diffusion through said barrier, diffusing the converted selected component gas through said foil layer to a distal side thereof, reconverting said selected component gas from said transportable state to its original state at said distal side of said foil layer and collecting said selected component gas after the reconversion, the improvement which consists of coating the foil layer of the gas diffusion barrier with a finely divided solid substance which is active in converting said selected component gas into a transportable state for diffusion through said barrier, whereby the rate of diffusion of said selected component gas is higher than that obtainable without said finely divided substance being coated on said foil layer.

4. In a method for separating a selected component gas from a multicomponent gas mixture which method includes the steps of directing a stream of the multicomponent gas mixture to a gas diffusion barrier having a foil layer which is permeable to the selected component gas and impermeable to other gases of the multicomponent gas mixture, converting said selected component gas into a transportable state at a proximal side of said foil layer for diffusion through said foil layer to a distal side thereof, reconverting said selected component gas from said transportable state at said distal side of said foil layer and collecting said selected component gas after the reconversion, the improvement which consists of coating the proximal and distal sides of the foil layer with a finley divided solid substance which is active both in converting said selected component gas into a transportable state for diffusion through said barrier and in reconverting said selected component gas from said transportable state to its original state, whereby the rate of diffusion of said selected component gas is higher than that obtainable without said finely divided substance being coated on said foil layer.

5. In a method for separating hydrogen from a multicomponent gas mixture which method includes the steps of directing a stream of the multicomponent gas mixture to a gas diffusion barrier having a foil layer which is permeable to hydrogen and impermeable to other gases of the multicomponent gas mixture, converting the hydrogen into a transportable state at a proximal side of said foil layer for diffusion through said barrier, diffusing the converted hydrogen through said foil layer to a distal side thereof, reconverting said hydrogen to its original state at said distal side of said foil layer and collecting the hydrogen after the reconversion, the improvement which comprises coating at least one side of said foil layer with a finely divided solid substance which is active in converting hydrogen into a transportable state for diffusion through said barrier, whereby the rate of diffusion of said selected component gas is higher than that obtainable without said finely divided substance being coated on said foil layer.

6. In a method according to claim 5, the improvement according to claim 5 wherein the finely divided substance with which the barrier is coated on at least one side comprises at least one of the group consisting of palladium, platinum, nickel, iron, cobalt, indium, sodium, lithium, uranium, titanium, zirconium, thorium, cerium and ruthenium.

(References on following page)

References Cited by the Examiner

UNITED STATES PATENTS

| | | | |
|---|---|---|---|
| 1,994,668 | 3/1935 | Russell | 117—107 |
| 2,789,064 | 4/1957 | Schladitz | 117—107.2 |
| 2,900,707 | 8/1959 | Brown | 29—194 |
| 2,958,391 | 11/1960 | De Rosset | 55—158 |
| 3,022,187 | 2/1962 | Eyraud | 55—16 |
| 3,049,797 | 8/1962 | Drummond | 29—194 |

FOREIGN PATENTS

| | | |
|---|---|---|
| 832,317 | 4/1960 | Great Britain. |
| 833,837 | 5/1960 | Great Britain. |
| 844,971 | 8/1960 | Great Britain. |

OTHER REFERENCES

Atomic International, NAA-Sr-5732, Jan. 15, 1962.

REUBEN FRIEDMAN, *Primary Examiner.*

HERBERT L. MARTIN, *Examiner.*